United States Patent [19]

Markovitz

[11] Patent Number: 5,618,891
[45] Date of Patent: Apr. 8, 1997

[54] SOLVENTLESS RESIN COMPOSITION HAVING MINIMAL REACTIVITY AT ROOM TEMPERATURE

[75] Inventor: Mark Markovitz, Schenectady, N.Y.

[73] Assignee: General Electric Co., Schenectady, N.Y.

[21] Appl. No.: 413,015

[22] Filed: Mar. 29, 1995

[51] Int. Cl.$^6$ .......................... C08F 283/00; C08G 8/28; B32B 27/38

[52] U.S. Cl. .......................... 525/481; 525/482; 525/485; 525/523; 525/524; 525/533; 525/534; 428/324; 428/364; 428/368; 428/375; 428/377; 428/413; 442/117

[58] Field of Search ..................... 525/481, 482, 525/485, 523, 524, 533, 534; 428/364, 375, 377, 413, 368, 245, 261, 265, 286, 324

[56] References Cited

U.S. PATENT DOCUMENTS

| | | | |
|---|---|---|---|
| 3,812,214 | 5/1974 | Markovitz | 260/830 TW |
| 3,868,613 | 2/1975 | Rogers, Jr. et al. | 336/206 |
| 3,975,757 | 8/1976 | Sporck | 357/72 |
| 4,112,183 | 9/1978 | Smith | 428/363 |
| 4,113,991 | 9/1978 | Smith et al. | 525/481 |
| 4,224,541 | 9/1980 | Smith et al. | 310/45 |
| 4,254,351 | 3/1981 | Smith et al. | 310/45 |
| 4,297,473 | 10/1981 | Koshibe et al. | 525/481 |
| 4,356,417 | 10/1982 | Smith et al. | 310/43 |
| 4,419,495 | 12/1983 | Davis | 525/111 |
| 4,440,914 | 4/1984 | Helfand et al. | 525/482 |
| 4,477,512 | 10/1984 | Thomas et al. | 428/236 |
| 4,501,787 | 2/1985 | Marchetti et al. | 428/236 |
| 4,603,182 | 7/1986 | Markovitz | 525/529 |
| 4,608,406 | 8/1986 | Williams, Jr. et al. | 524/424 |
| 4,656,090 | 4/1987 | Markovitz | 428/364 |
| 4,692,272 | 9/1987 | Goswami et al. | 525/429 |
| 4,704,322 | 11/1987 | Roberts | 428/251 |
| 4,792,479 | 12/1988 | Marchetti et al. | 428/236 |
| 4,959,425 | 9/1990 | Walker et al. | 525/482 |
| 5,137,768 | 8/1992 | Lin | 428/116 |

*Primary Examiner*—John C. Bleutge
*Assistant Examiner*—Randy Gulakowski
*Attorney, Agent, or Firm*—Domenica N. S. Hartman; Robert C. Lampe, Jr.

[57] ABSTRACT

A resin composition is provided that is suitable for impregnating sheet material, including fabrics, films, paper and tapes of the type employed to form prepregs, such as tapes used to form electrical insulation layers on electrical components. The resin composition includes a solid or semi-solid epoxy resin having an epoxide functionality of at least 2.5, a metal acetylacetonate for catalyzing the epoxy resin, and an accelerator of bisphenol A-formaldehyde novolac catalyzed by an acidic catalyst and having a hydroxyl equivalent weight of 120. The resin composition is essentially unreactive at room temperature and at elevated temperatures sufficient to enable permeation of the sheet material by the resin in its manufacture, is essentially unreactive at temperatures required to remove moisture and volatiles during processing of articles wrapped or taped with the sheet material, and cures at a higher temperature without adversely affecting the cure characteristics of the resin composition. The resin composition of this invention achieves the desirable reactivity characteristics noted above, while exhibiting enhanced mechanical, thermal and electrical properties necessary for its use within an electrical insulation composite.

18 Claims, 1 Drawing Sheet

SOLVENTLESS RESIN COMPOSITION HAVING MINIMAL REACTIVITY AT ROOM TEMPERATURE

This invention generally relates to epoxy resin technology. More particularly, this invention is directed to a solventless epoxy resin composition characterized by high viscosity, solid or semi-solid consistency, long shelf life, and minimal reactivity at heat processing temperatures, and further characterized by reactivity at higher curing temperatures to form a solid having excellent mechanical and electrical insulating properties, such that the epoxy resin composition is highly suitable for use as a binder material for sheet materials used as electrical insulation.

BACKGROUND OF THE INVENTION

Polymer-impregnated sheet material, such as fabrics, films, paper and tapes, have been widely employed to form electrical insulation for various electrical equipment and components, including high voltage stator bars of a generator. Formation of such insulation generally involves the use of a pre-impregnated sheet material, often referred to as a prepreg, that can be applied directly to a member to be insulated. Various materials can be employed as the sheet material and the impregnation material, depending on the requirements of the applications.

As taught by U.S. Pat. Nos. 3,812,214, 4,603,182 and 4,656,090 to Markovitz, each assigned to the assignee of this invention, a prepreg of mica paper backed with a woven fabric backer, such as woven fiberglass, is often used in the manufacturing of high voltage stator bars. The mica paper can be employed with a single backer or in combination with two backers, in which one backer can be a woven fabric such as fiberglass while the second can be another woven fabric, a non-woven fabric such as a polyester mat, or a polyester or polyimide film. In each case, an epoxy resin binder is used to permeate through the mica paper and the backers, and to bond each backer to the mica paper so as to form a prepreg sheet.

Prepregs of the type taught by Markovitz are typically slit into tapes that can be more readily wrapped around a conductor, such as a stator bar of a generator. Typically, multiple layers of tape are tightly wrapped around the conductor, usually overlapping by one-half the width of the tape. After being wrapped with a sacrificial release film to protect the tape and prevent contamination, the conductor and its tape wrapping are then placed in an autoclave for vacuum heat treatment and subsequent curing. Vacuum heat treatment is carried out to remove air, moisture and any solvent or volatile compound present in the resin binder, so as to prevent formation of voids in the cured insulation that would otherwise adversely affect the quality of the insulation and induce premature insulation failure due to breakdown under electrical stress. Thereafter, the taped conductor undergoes a cure under pressure to consolidate the tape insulation, such that the resin binder bonds the mica paper and each of its backers together to form a void-free solid insulation.

In order to reliably form a high quality insulation, several requirements must be met in the manufacture and processing of resin-impregnated sheet materials, such as the mica tape and the taped conductor noted above. Preferably, the resin binder is a semi-solid or solid at room temperature, yet sufficiently flexible to make the sheet material pliable. Furthermore, the binder must have a sufficiently high molecular weight to act as an adhesive for bonding the prepreg components together, and must be substantially tack-free to prevent the prepreg from sticking together (i.e., blocking).

In addition, during the manufacture of the prepreg, the resin binder must be able to permeate through the sheet materials, as well as act as an adhesive to the one or two backers used in the construction of the prepreg. One known approach is to add a solvent, such as methyl ethyl ketone, acetone or toluene, to a semi-solid or solid resin so as to reduce its viscosity. While this approach is effective, a shortcoming is the relatively large amount of solvent that must be removed during the subsequent vacuum heat treatment of the taped conductor, an amount that is typically much greater than the moisture content of the tape. As noted previously, if the solvent is not completely removed, the retained solvent will adversely affect the cured properties of the binder and can promote the formation of voids in the cured insulation. An additional shortcoming of the use of solvents is the environmental and safety concerns associated with their use.

An additional requirement is that, during processing of a conductor wrapped or taped with the prepreg, the vacuum heat treatment must sufficiently lower the viscosity of the resin binder within the sheet material and increase the vapor pressure of its volatile compounds, so as to enable the removal of the volatile components. Such a requirement is particularly important in the use of multiple, tightly-wrapped layers of mica tape. For example, vacuum cycles of at least about five hours and often up to about twelve hours, at temperatures of up to about 120° C, are typically required to remove the volatile compounds from the multiple tape layers around a stator bar. However, a significant problem with this step is the tendency for the resin binder to be reactive at the vacuum heat treatment temperatures necessary to adequately reduce the viscosity of the binder so as to remove the volatiles. As a result, the binder will begin to gel, particularly if the temperature is too high, the duration of the cycle is excessive, or if the prepreg is aged such that the resin binder has already begun to react.

Finally, the resin binder must be able to flow under pressure during the curing stage in order to fill all voids between the prepreg layers and between the prepreg and the conductor. However, if gelation has occurred during the vacuum heat treatment cycle, there will be insufficient resin flow during cure, such that voids will likely remain and degrade the effectiveness and the life of the cured insulation. While the reactivity of the binder could be reduced in order to prevent gelation during vacuum heat treatment, the result has been a reactivity which is inadequate to achieve sufficient cure during the cure cycle within a practical process cycle of about twelve hours at about 165° C.

While the above-noted U.S. Pat. Nos. 3,812,214, 4,603,182 and 4,656,090 to Markovitz advanced the art of resin binders that are suitable for forming prepreg mica tapes, the disclosed resins do not exhibit an optimized reactivity. Specifically, these resins exhibit some degree of reactivity at temperatures necessary to completely remove their volatile components. As a result, gelation tends to occur during the vacuum heat treatment cycle, preventing the elimination of voids and thereby degrading the effectiveness and life of the insulation. In the use of these resins, gelation is avoided only by carefully monitoring the hot vacuum cycle, thereby complicating processing. Furthermore, these resins have tended to react over extended periods at room temperature, such as periods in excess of one month, necessitating that they be refrigerated in order to promote their shelf life.

Finally, the resin compositions taught by U.S. Pat. Nos. 4,603,182 and 4,656,090 included styrene or vinyl toluene as diluents, which are reactive and volatile compounds, that can be removed during vacuum heat treatment, and thereby result in a variable product depending on how much was removed. Because these resin compositions have a tendency to gel during the hot vacuum cycle, such gelation hinders the ability to achieve adequate compaction in order to obtain a void-free insulation. Accordingly, the mechanical and electrical properties of a resulting cured insulation can be diminished.

In view of the above, it would be desirable if a resin binder were available that exhibited more optimal reactivity properties, specifically in terms of being: essentially unreactive at room temperature for storage stability; essentially unreactive at about 50° C. to about 120° C. in order to enable manufacture of the prepreg by hot melt soaking; essentially unreactive and having a low viscosity at a suitable vacuum heat treatment temperature so as to remove air, moisture and volatiles during processing of a conductor wrapped or taped with the sheet material; and highly reactive at practical curing temperatures. If such a resin binder were to exist, a substantial improvement could be achieved in the shelf life of mica tapes, the removal of volatile components during processing of the taped conductor, the avoidance of void formation during curing, and the effectiveness and life of the resulting insulation.

SUMMARY OF THE INVENTION

It is an object of this invention to provide a resin composition that enables the manufacture of a resin-rich prepreg by heat treating at temperatures on the order of about 50° C. to about 120° C., wherein the resin is able to penetrate through the prepreg components without the presence of any solvents in the resin.

It is a further object of this invention that such a resin composition exhibit little or no reactivity at room temperature and temperatures sufficient to reduce the viscosity of the resin and remove any volatiles within the resin.

It is another object of this invention that such a resin composition enable the manufacture of a resin-rich prepreg that can be vacuum heat treated without the risk of pre-gelation.

It is still a further object of this invention that such a resin composition be reactive at an elevated temperature and therefore curable within a practical time period so as to form a solid that is characterized by desirable mechanical and electrical insulating properties.

It is yet another object of this invention that such a resin composition have an extended shelf life of at least one year without requiring refrigeration.

The present invention provides a resin composition that is suitable for impregnating sheet materials, including fabrics, films, paper and tapes, to form a resin-rich prepreg, such as the type employed to form electrical insulation for electrical components. More particularly, the resin composition of this invention has been determined to be essentially unreactive at room temperature and at elevated temperatures that enable permeation of the sheet material by the resin, and essentially unreactive during a subsequent vacuum heat treatment of an article wrapped or taped with the prepreg for the purpose of reducing resin viscosity and removing volatiles, without adversely affecting the cure characteristics of the resin composition.

Accordingly, the resin composition is particularly suitable for forming an electrical insulation layer on a conductor, such as a high voltage stator bar of a generator. The resin composition of this invention achieves the desirable reactivity characteristics noted above, while exhibiting enhanced mechanical and electrical properties necessary for its use within an electrical insulation system.

The above advantages are achieved by a solventless thermosetting resin composition composed of a solid or semi-solid epoxy resin having an epoxide functionality of at least 2.5, a metal acetylacetonate for catalyzing the solid or semi-solid epoxy resin, and an accelerator of bisphenol A-formaldehyde novolac catalyzed by an acidic catalyst and having a hydroxyl equivalent weight of 120.

In accordance with the teachings of this invention, the resin composition is substantially unreactive at a temperature of up to at least about 120° C., and is reactive at a temperature of about 165° C. to form a solid material having mechanical and electrical properties that are suitable to enable the solid material to serve as an electrical insulating material. The resin composition enables the manufacture of resin-rich prepregs by heat treating at temperatures on the order of about 5° 0C. to about 120° C., during which the viscosity of the resin composition is sufficiently reduced to enable the resin composition to penetrate through a sheet material without the presence of any solvents in the composition.

In accordance with this invention, the solid or semi-solid epoxy resin constitutes the primary epoxy component for obtaining the desirable adhesive properties for a prepreg impregnated with the resin composition, and for achieving the desirable semi-solid or solid consistency of the resin composition. A liquid epoxy resin having an epoxide functionality of 2 can replace a portion of the solid or semi-solid epoxy resin, if a softer and more pliable sheet material is desired. It has been determined that such a substitution can be carried out for up to about fifty weight percent of the solid or semi-solid epoxy resin without significantly affecting the reactivity of the resin composition or its cured properties.

A significant advantage of this invention is that the resin composition exhibits more optimal reactivity properties than the resin compositions of the prior art, particularly in terms of being essentially unreactive at temperatures up to and including those necessary for sufficiently reducing the viscosity of the resin composition for vacuum heat treatment. Accordingly, the resin composition of this invention provides for substantial improvements in the shelf life of impregnated sheet materials, such as mica tapes used to wrap electrical components, to the extent that a shelf life of more than a year can be achieved without refrigeration.

In addition, the resin composition is also unreactive at temperatures necessary to enable the removal of volatile components from a sheet material impregnated with the resin composition. As such, the resin composition enables the manufacture of resin-rich prepregs, such as mica tapes, that can be vacuum and heat treated without the risk of pre-gelation, while also promoting the effectiveness and life of an insulation system formed by the prepreg.

Another significant advantage of this invention is that the above is achieved without adversely affecting the cure characteristics of the prepreg and the mechanical and electrical properties desired for materials of the type used to form insulation layers for electrical components. Specifically, the resin composition of this invention is highly reactive at a suitable curing temperature above the vacuum heat treatment temperature, so as to be curable within a practical time period to form a solid that is characterized by enhanced mechanical and electrical insulating properties.

Other objects and advantages of this invention will be better appreciated from the following detailed description

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

The present invention provides a resin composition whose processing characteristics and mechanical and electrical properties make the composition particularly well suited for use as a binder for a prepreg electrical insulating material for electrical equipment and components, such as a high voltage stator bar for a generator. The resin composition of this invention is characterized by being stable and unreactive at temperatures of up to about 120° C. and reactive and curable via an epoxy-epoxy reaction to form a solid or semi-solid thermoset material at temperatures of about 165° C. and above. At temperatures of about 50° C. to about 120° C., the resin composition is further characterized as having a viscosity that is sufficiently low so as to enable the resin composition to readily permeate a sheet material, such as a fabric film, paper or tape, and thereby form a prepreg. In view of the resin composition being essentially unreactive at about 50° C. to about 120° C., the resin composition does not begin to gel and cause the prepreg to stiffen during the period in which the resin composition is required to permeate the sheet material. In addition, the prepreg can be subsequently vacuum and heat treated at about 120° C. for periods as long as about twelve hours to remove air, moisture and other volatiles, without risk of pregelation.

Figure 1:
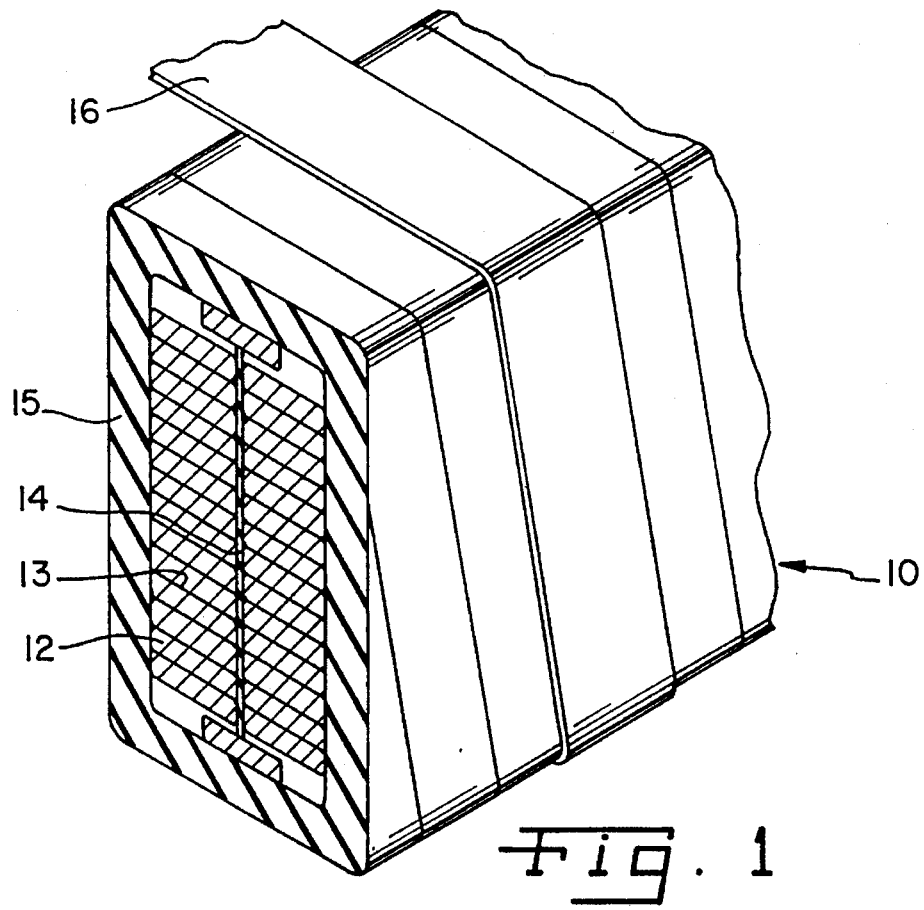
FIG. 1 shows in perspective a cross-section of a portion of a stator bar, in which the star bar is wrapped with a prepreg tape manufactured in accordance with this invention.

Referring to FIG. 1, a stator bar 10 for a generator is represented that illustrates some of the general concepts of this invention, as well as a suitable application for the resin composition of this invention. As shown, the stator bar 10 is composed of a number of conducting copper strands 12 that are insulated from each other by strand insulation 13, as is conventional in the art. In addition, the conductor strands 12 are arranged to form two arrays that are separated by a strand separator 14. Surrounding both arrays is a groundwall insulation 15 formed by multiple wrappings of a mica paper tape 16 manufactured in accordance with the teachings of this invention.

Figure 2:
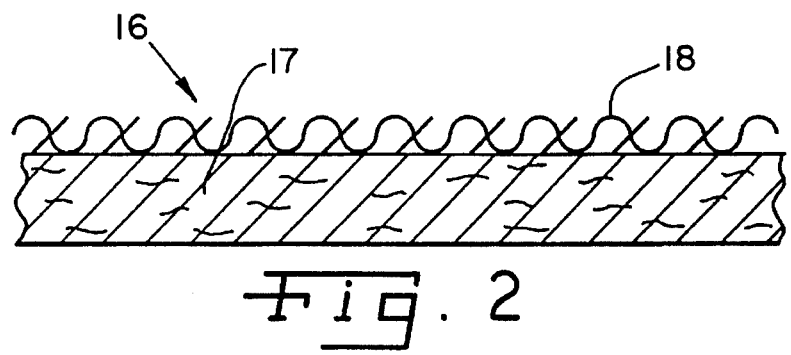
FIGS. 2 and 3 show cross-sectional views of alternative embodiments for the prepreg tape of FIG. 1.
Figure 3:
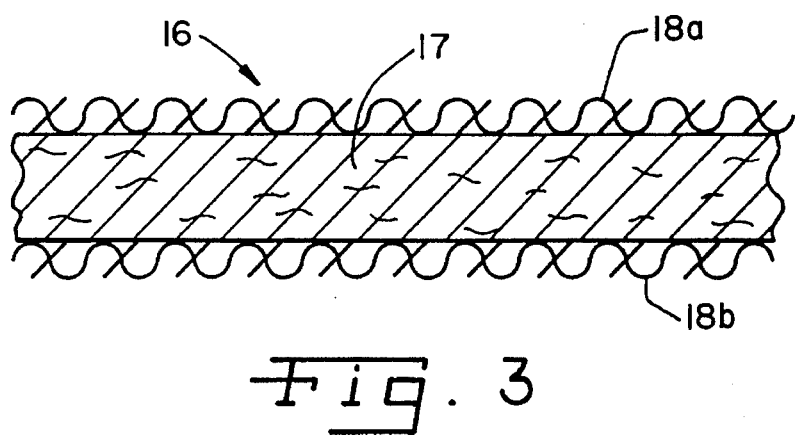

As illustrated in FIGS. 2 and 3, the mica paper tape 16 is a prepreg composed of a mica paper 17 backed by a single woven backing 18 (FIG. 2) or a pair of backings 18a and 18b (FIG. 3), and impregnated with the resin composition of this invention. In the latter configuration, one of the backings 18a, or 18b can be a woven fabric such as fiberglass while the second can be another woven fabric, a non-woven fabric such as a polyester mat, or a polyester or polyimide film. In each case, the resin composition of this invention is used to permeate through the mica paper 17 and to bond each backing 18, 18a and 18b to the mica paper 17, thereby forming the prepreg tape 16. As such, the resin composition affects the properties of the mica paper tape 16 both while in the prepreg state, and after vacuum heat treatment and curing steps are performed by which the mechanical and electrical properties of the mica paper tape 16 and the groundwall insulation 15 are acquired.

The above-described stator bar 10 is merely intended to represent generally conventional conductors over which it is desirable to provide electrical insulation layers formed by a resin-impregnated sheet material. Therefore, the teachings of this invention are not limited to the specific configuration shown in the FIG., and are equally applicable to various other electrical components and assemblies that benefit from the presence of electrical insulation layers. It is also foreseeable that the resin composition of this invention could be employed for various applications other than those involving a prepreg. Accordingly, those skilled in the art will recognize that numerous applications for the resin composition of this invention are possible, all of which are within the scope of this invention.

As noted above, a key feature of this invention is that the resin composition is formulated to have reaction characteristics that facilitate the manufacture of a resin-impregnated sheet material, such as the mica paper tape 16 shown in FIG. 1. In accordance with this invention, it has been unexpectedly determined that the desired properties and characteristics described above are achieved through the combination of a solid or semi-solid epoxy resin having an epoxide functionality of at least 2.5, a metal acetylacetonate as a catalyst for the epoxy resin, and a bisphenol A-formaldehyde novolac as an accelerator. A preferred formulation for the resin composition is a metal acetylacetonate content of about 0.1 to about 1 percent by weight of the epoxy resin, and an accelerator content of about 5 to about 15 percent by weight of the epoxy resin. The above formulation can be modified by substituting a liquid epoxy resin having an epoxide functionality of 2 for up to about fifty weight percent of the solid or semi-solid epoxy resin. Solventless resin compositions formulated in accordance with the above are very viscous, solid or semi-solid at a temperature of about 25° C., but become fluid liquids with a viscosity of less than about 10,000 centipoise (cps) at about 120° C.

A preferred accelerator for the resin composition is a bisphenol A-formaldehyde novolac available from Georgia-Pacific Resins, Inc., under the name BRWE 5300. The preferred accelerator is made with an acidic catalyst, usually oxalic acid, and is characterized by a melt viscosity of about 800 to about 1600 cps at about 125° C, a hydroxyl equivalent weight of 120, and a Mettler softening point of about 80° C. to about 105° C. Other bisphenol A-formaldehyde novolacs having lower or higher melt viscosities or softening points, indicative of a lower or higher molecular weight, can be used as the accelerator, with the limitation that their hydroxyl equivalent weight is 120, since bisphenol A must be used in the acid-catalyzed reaction with formaldehyde in order to yield an accelerator having the desired reactivity properties. As a nonreactive accelerator, the bisphenol A-formaldehyde novolac must be present in an amount less than the stoichiometric level in terms of the epoxy:novolac and epoxy equivalent:phenolic hydroxyl equivalent ratios.

The solid or semi-solid epoxy resin serves as the primary epoxy component for obtaining the desired adhesive properties and the desired pliability of the mica paper tape 16 in its prepreg state. Preferred solid or semi-solid epoxy resins for the resin composition include epoxy novolacs such as DEN 439 and DEN 438, available from Dow Chemical Co., though it is foreseeable that other epoxy resins having an epoxide functionality of at least 2.5 could be used. The DEN 439 resin is particularly preferred, and is characterized by an epoxide functionality of 3.8, an epoxide equivalent weight of 191 to 210, and a Mettler softening point of about 48° C. to about 58° C. DEN 438 is characterized as having an epoxide functionality of 3.6, an epoxide equivalent weight of 176 to 181, and a viscosity of about 20,00 to about 50,000 cps at about 52° C. Another epoxy novolac resin that can be used is DEN 485, also manufactured by Dow Chemical Co. DEN 485 has an epoxide functionality of 5.5, an epoxide equivalent weight of 165 to 195, and a softening point of about 66° C. to about 80° C.

Other solid or semi-solid epoxy resins with an epoxide functionality of at least 2.5 include epoxy cresol novolacs made by the Ciba Chemical Co., such as: ECN 1235 with an epoxide functionality of 2.7, an epoxide equivalent weight of 200 to 227, and a melting point of about 34° C. to about 42° C. ; ECN 1273 with an epoxide functionality of 4.8, an epoxide equivalent weight of 217 to 233, and a melting point of about 68° C. to about 78° C.; ECN 1280 with an epoxide functionality of 5.0, an epoxide equivalent weight of 213 to 233, and a melting point of about 78° C. to about 85° C.; and ECN 1299 with an epoxide functionality of 5.4, an epoxide equivalent weight of 217 to 244, and a melting point of about 85° C. to about 100° C.

Suitable solid or semi-solid epoxy resins with an epoxide functionality of at least 2.5 also include tetra functional phenol such as MT0163, available from Ciba Chemical Co. and having an epoxide functionality of 4, an epoxide equivalent weight of 179 to 200, and a melting point of about 55° C. to about 95° C., and Epon 1031, available from Shell Chemical Co. and having an epoxide functionality of 3.5, and an epoxide equivalent weight of 200 to 240, which is a solid resin having a kinematic viscosity of about Z2 to about Z7 at about 25° C. as an 80 percent weight solution in methyl ethyl ketone.

Other suitable solid epoxy resins with an epoxide functionality of at least 2.5 include modified epoxy novolacs such as the EPI-REZ SU resins made by Shell Chemical Co., such as EPI-REZ SU-2.5 with an epoxide functionality of 2.5, an epoxide equivalent weight of 180 to 200, and a melt viscosity of about 2500 to about 4500 centistokes at about 52° C., EPI-REZ SU-3.0 with an epoxide functionality of 3.0, an epoxide equivalent weight of 187 to 211, and a melt viscosity of about 20,000 to about 50,000 centistokes at about 52° C. and EPI-REZ SU-8 with an epoxide functionality of 8.0, an epoxide equivalent weight of 195 to 230, and a melting point of about 77° C. to about 82° C.

As noted above, up to about fifty weight percent of the solid or semi-solid epoxy resin can be replaced in the resin composition with a liquid epoxy resin having an epoxide functionality of 2. Substitution of the liquid epoxy resin for the solid or semi-solid epoxy resin can be employed to produce a softer and more pliable tape 16 without introducing volatile components or significantly affecting the reactivity and cure properties of the resin composition of this invention. A preferred difunctional epoxy resin is the liquid bisphenol A-diglycidyl ether epoxy resin Epon 826, available from Shell Chemical Co. and characterized by an epoxide functionality of 2, an epoxide equivalent weight of 178 to 186, and a viscosity of about 6500 to about 9500 cps at about 25° C. Offsets of Epon 826 include Araldite GY 6008 available from Ciba Chemical Co., DER 330 available from Dow Chemical Co., and EPOTUF 37-139 available from Reichhold Co.

Other suitable liquid bisphenol A-diglycidyl ether epoxy resins include the following made by Shell Chemical Co.: Epon 828 with an epoxide equivalent weight of 185 to 192 and a viscosity of about 11,000 to about 15,000 cps at about 25° C.; Epon 830 with an epoxide equivalent weight of 190 to 198 and a viscosity of about 17,700 to about 22,500 cps at about 25° C.; and Epon 834 with an epoxide equivalent weight of 230 to 280 and a Gardner-Holdt viscosity O-V at about 25° C. when measured as a 70 percent weight solution in diethylene glycol monobutyl ether. Many other similar liquid bisphenol A-diglycidyl ether epoxy resins made by different manufacturers could also be foreseeably used.

Suitable liquid bisphenol F-diglycidyl ether epoxy resins include Epon DPL-862, made by Shell Chemical Co. and having an epoxide equivalent weight of 166 to 177 and a viscosity of about 3000 to about 4500 cps at about 25° C., and bisphenol F-diglycidyl ether epoxy resins made by Ciba Chemical Co., such as Araldite GY 281 with an epoxide equivalent weight of 158 to 175 and a viscosity of about 5000 to about 7000 cps at about 25° C., and Araldite GY 308 with an epoxide equivalent weight of 173 to 182 and a viscosity of about 6500 to about 8000 cps at about 25° C.

Other liquid epoxy resins with an epoxide functionality of 2.0 that could be used include cycloaliphatic epoxy resins such as: 3,4-epoxycyclohexylmethyl -3,4-epoxycyclohexane carboxylate (ERL 4221 from Union Carbide), with an epoxide equivalent weight of 131 to 143 and a viscosity of about 350 to about 450 cps at about 25° C.; 2-(3,4-epoxycyclohexyl -5,5-spiro-3,4-epoxy) cyclohexane metadioxane (ERL 4234 from Union Carbide), with an epoxide equivalent weight of 133 to 154 and a viscosity of about 7000 to about 17,000 cps at about 38° C.; and 3,4-epoxy-6-methylcyclohexylmethyl adipate (ERL 4289 from Union Carbide), with an epoxide equivalent weight of 205 to 216 and a viscosity of about 500 to about 1000 cps at about 25° C. Offsets of any of the epoxy resins made by other manufactures or mixtures of epoxy resins can also be used.

The metal acetylacetonate of the resin composition is preferably aluminum acetylacetonate ($Al(C_5H_{7O_{22}})_3$).

Notably, a solvent is completely omitted from the resin composition formulated in accordance with the above. Consequently, the complications and defects attributable to the requirement to completely remove a solvent from the tape 16 during thermal processing is altogether avoided. In addition, the resin composition surprisingly is essentially unreactive over a broad temperature range of up to at least about 120° C., yet is fully reactive at a temperature of about 165° C. The proximity of these temperatures is highly advantageous from a processing standpoint, since the relatively high maximum temperature at which the resin composition is unreactive permits a vacuum and heat treatment cycle to be conducted for as long as about fifteen hours without gelation of the resin composition. As such, curing can be successfully carried out at about 165° C. for a duration of as little as about six hours to yield a consolidated tape 16 characterized by a fully compacted mica paper insulation and a fully cured resin in which voids are essentially absent.

Those skilled in the art will gain a better understanding of the present invention and its advantageous properties and characteristics from the following illustrative examples, which have been carried out experimentally using resin compositions formulated in accordance with this invention.

EXAMPLE 1

(Prior Art)

The processing characteristics and properties of a resin composition formulated in accordance with the prior art, and widely used to manufacture resin-rich tapes, is illustrated in this Example. Generally, the resin composition evaluated under Example 1 employed a combination of epoxy resins and a phenol-formaldehyde novolac curing agent. Mica paper tapes of the type shown in the Figures are typically manufactured by diluting the resin composition with a solvent, since the pot life stability of the resin is too short for hot melt processing. However, the resin composition employed in this Example was processed by hot melting the resin in order to eliminate possible complications associated with the use of a solvent when comparing the results of Example 1 with subsequent Examples employing resin compositions formulated in accordance with this invention. Accordingly, all of the test samples used solventless resins.

The resin composition of Example 1 was composed of 50 parts-by-weight (pbw) of the epoxy novolac DEN 438, 50.0 pbw of the bisphenol A-diglycidyl ether epoxy resin Epon 828, and 60.0 pbw of a phenol-formaldehyde novolac resin having a weight average molecular weight of about 1500 to about 1800. The shelf life stability of the resin was about three months at room temperature (about 18° C. to about 32° C.). During heating at about 120° C., samples of the resin composition were found to gel within about six hours. A cure cycle was then performed in which the resin was cured for about twelve hours at about 165° C. to produce solid specimens. The Shore D hardnesses of the specimens were about 70 to about 90 at room temperature (about 25° C.) and about 30 to about 40 at a temperature of about 160° C. The percent dissipation factors for the specimens at 60 hertz and 10 volts per mil (Vpm) were 0.16, 3.46 and 36.04 at room temperature, 155° C. and 200° C., respectively. The percent weight losses for ten gram discs having a diameter of about 5.7 centimeters and aged twenty-eight days at about 180° C. and about 200° C. were 0.75 and 1.32, respectively.

EXAMPLE 2

A clear, semi-solid resin was made in accordance with this invention by combining about 90 pbw DEN 439, about 10 pbw Epon 826 (i.e., Epon 826 was substituted for about 10 weight percent of DEN 439), about 7.5 pbw BRWE 5300, and about 0.25 pbw aluminum acetylacetonate, followed by heating and stirring the mixture at about 100° C.. The stability of the resin composition was in excess of about twenty-four months. The resin composition had not gelled after about fifteen hours at about 120° C., and was thereafter fully cured after ten hours at about 165° C. The resulting specimens had Shore D hardnesses of about 85 to about 90 at room temperature (about 25° C.) and about 75 to about 85 at a temperature of about 160° C. The percent dissipation factors for the samples (60 Hz, 10 Vpm) were 0.116, 2.508, 2,970 and 2.730 at room temperature, 155° C., 180° C. and 200° C., respectively. The percent weight losses for ten gram discs having a diameter of about 5.7 centimeters and aged twenty-eight days at about 180° C. and about 200° C. were 0.15 and 0.80, respectively.

EXAMPLE 3

A clear, semi-solid resin was made in accordance with this invention by combining about 80 pbw DEN 439, about 20 pbw Epon 826, about 7.5 pbw BRWE 5300, and about 0.25 pbw aluminum acetylacetonate, followed by heating and stirring the mixture at about 100° C. As with the resin composition of Example 2, the resin composition of this Example had a stability in excess of about twenty-four months, did not gel after about fifteen hours at about 120° C., and was fully cured after ten hours at about 165° C. The resulting samples had Shore D hardnesses of about 80 to about 90 at room temperature and about 60 to about 75 at about 160° C. The percent dissipation factors for the samples (60 Hz, 10 Vpm) were 0,103, 2,854, 3.120 and 2,690 at room temperature, 155° C., 180° C. and 200° C., respectively. The percent weight losses for ten gram discs having a diameter of about 5.7 centimeters and aged twenty-eight days at about 180° C. and about 200° C. were 0.17 and 0.84, respectively.

EXAMPLE 4

A clear, semi-solid resin was made in accordance with this invention by combining about 70 pbw DEN 439, about 30 pbw Epon 826, about 7.5 pbw BRWE 5300, and about 0.25 pbw aluminum acetylacetonate, followed by heating and stirring the mixture at about 100° C. As with the resin compositions of Examples 2 and 3, the resin composition of this Example had a stability in excess of about twenty-four months, did not gel after about fifteen hours at about 120° C., and was fully cured after ten hours at about 165° C. The resulting specimens had Shore D hardnesses of about 85 to about 90 at room temperature and about 65 to about 85 at about 160° C. The percent dissipation factors for the specimens (60 Hz, 10 Vpm) were 0.105, 3,040, 3,250 and 2,847 at room temperature, 155° C., 180° C. and 200° C., respectively. The percent weight losses for ten gram discs having a diameter of about 5.7 centimeters and aged twenty-eight days at about 180° C. and about 200° C. were 0.21 and 0.94, respectively.

EXAMPLE 5

A clear, semi-solid resin was made in accordance with this invention by combining about 70 pbw DEN 439, about 30 pbw Epon 826, about 10 pbw BRWE 5300, and about 0.25 pbw aluminum acetylacetonate, followed by heating and stirring the mixture at about 100° C. As with the resin compositions of Examples 2 through 4, the resin composition of this Example had a stability in excess of about twenty-four months, and did not gel after about fifteen hours at about 120° C. After curing at about 165° C. for about eight hours, the resulting specimens had Shore D hardnesses of about 80 to about 90 at room temperature and about 75 to about 85 at about 160° C. The percent dissipation factors for the specimens (60 Hz, 10 Vpm) were 0.104, 2.02, 3.980 and 1.540 at room temperature, 155° C., 180° C. and 200° C., respectively. The percent weight losses for ten gram discs having a diameter of about 5.7 centimeters and aged twenty-eight days at about 180° C. and about 200° C. were 0.17 and 0.87, respectively.

EXAMPLE 6

A clear, semi-solid resin was made in accordance with this invention by combining about 70pbw DEN 439, about 30 pbw Epon 826, about 12.5 pbw BRWE 5300, and about 0.25 pbw aluminum acetylacetonate, followed by heating and stirring the mixture at about 100° C. As with the resin compositions of Examples 2 through 5, the resin composition of this Example had a stability in excess of about twenty-four months. The resin composition had not gelled after about twelve hours at about 120° C., and was cured after about eight hours at about 165° C. The Shore hardness was about 80 to about 90 at room temperature and about 80 to about 85 at about 160° C. The percent dissipation factors for the specimens (60 Hz, 10 Vpm) were 0.123, 1.850, 3.418 and 1.420 at room temperature, 155° C., 180° C. and 200° C., respectively. The percent weight losses for ten gram discs having a diameter of about 5.7 centimeters and aged twenty-eight days at about 180° C. and about 200° C. were 0.17 and 0.89, respectively.

EXAMPLE 7

A clear, very viscous resin was made in accordance with this invention by combining about 50 pbw DEN 438, about 50 pbw Epon 826, about 12.5 pbw BRWE 5300, and about 0.25 pbw aluminum acetylacetonate, followed by heating and stirring the mixture at about 100° C. As with the resin compositions of Examples 2 through 6, the resin composition of this Example had a stability in excess of about twenty-four months. The resin composition had not gelled after about twelve hours at about 120° C. After a cure of about twelve hours at about 165° C., the Shore hardness was about 80 to about 90 at room temperature and about 70 to about 80 at about 160° C. The percent dissipation factors for the specimens (60 Hz, 10 Vpm) were 0.284, 1.466 and 1.650 at room temperature, 155° C. and 180° C., respectively. The percent weight losses for ten gram discs having a diameter of about 5.7 centimeters and aged twenty-eight days at about 180° C. and about 200° C. were 0.47 and 1.24, respectively.

From the above examples, it can be seen that the resin compositions formulated in accordance with this invention exhibited superior stability, mechanical and electrical properties, and shelf life and aging characteristics as compared to the prior art composition of Example 1. Most notably, the shelf life of the formulations of Examples 2 through 7 exceeded that of the prior art by a factor of eight, and were unreactive for exposures of up to about fifteen hours at 120° C. Thereafter, curing of the formulations resulted in specimens that demonstrated the physical, thermal and electrical superiority of the resin composition of this invention as compared to the prior art resin composition.

Accordingly, it can be seen that a significant advantage of resin compositions formulated in accordance with this invention is that they are essentially unreactive at storage temperatures. Accordingly, resin compositions of this invention provide for substantial improvements in the shelf life of a mica paper tape or other resin-rich prepreg, to the extent that a shelf life of at least two years can be achieved without refrigeration.

In addition, the resin compositions of this invention are also unreactive at temperatures necessary to reduce the viscosity of the resin composition during vacuum heat treatment of a prepreg, so as to enable the removal of volatile components from the prepreg. As such, the resin composition enables the manufacture of resin-rich prepregs that can be vacuum and heat treated without the risk of pre-gelation, while also promoting the effectiveness and life of an insulation composite formed from the prepreg.

Another significant advantage of this invention is that the above processing characteristics are achieved without adversely affecting the cure properties desired for tapes 16 of the type shown in the FIGS. Specifically, the resin composition of this invention is highly reactive at a suitable curing temperature above the vacuum heat treatment temperature, so as to be curable within a practical time period to form a solid that is characterized by enhanced mechanical and electrical insulating properties.

While our invention has been described in terms of a preferred embodiment, it is apparent that other forms could be adopted by one skilled in the art. For example, while the disclosure is directed to resin-rich prepregs of the type that are cured in an autoclave, various resin-impregnated sheet materials can be manufactured with the resin composition of this invention. Because of the high reactivity of these prepregs at 165° C. and higher temperatures, the various resin-impregnated sheet and tape materials could be used for insulating conductors by curing in a hot press instead of an autoclave. Furthermore, the resin composition of this invention can be used in the manufacture of precured sheet materials, fabrics and films. Accordingly, the scope of our invention is to be limited only by the following claims.

What is claimed is:

1. A solventless thermosetting resin composition consisting essentially of:

a resin comprising a solid or semi-solid epoxy resin having an epoxide functionality of at least 2.5 and up to about 50 weight percent of a liquid epoxy resin having an epoxide functionality of 2;

a metal acetylacetonate for catalyzing the resin; and a substantially nonreactive accelerator of bisphenol A-formaldehyde novolac catalyzed by an acidic catalyst and having a hydroxyl equivalent weight of 120, the accelerator being present in the solventless thermosetting resin composition in an amount equal to about 5 to about 15 weight percent of the resin but in an amount less than the stoichiometric level in terms of the epoxy:novolac and epoxy equivalent:phenolic hydroxyl equivalent ratios;

wherein the solventless thermosetting resin composition is substantially unreactive at a temperature of up to at least about 120° C. and undergoes an epoxy-epoxy reaction at a temperature of about 165° C. to form a solid material having mechanical, thermal and electrical properties that are suitable to enable the solid material to serve as an electrical insulating material.

2. A solventless thermosetting resin composition as recited in claim 1, wherein the accelerator has a melt viscosity of about 800 to about 1600 centipoise at about 125° C.

3. A solventless thermosetting resin composition as recited in claim 1, wherein the solid or semi-solid epoxy resin is an epoxy novolac resin.

4. A solventless thermosetting resin composition as recited in claim 1, wherein the metal acetylacetonate constitutes about 0.1 to about 1 weight percent of the resin.

5. A solventless thermosetting resin composition as recited in claim 1, wherein the liquid epoxy resin is a bisphenol A- or F-diglycidyl ether epoxy resin.

6. A solventless thermosetting resin composition as recited in claim 1, wherein the solventless thermosetting resin composition remains unreactive for at least two years at room temperature.

7. A solventless thermosetting resin composition as recited in claim 1, wherein the solventless thermosetting resin composition has a viscosity of not more than about 10,000 cps at a temperature of about 120° C.

8. An article impregnated with a solventless epoxy resin composition, the solventless epoxy resin composition consisting essentially of:

an epoxy resin comprising:
   a solid or semi-solid epoxy resin having an epoxide functionality of at least 2.5; and
   up to about 50 weight percent of a liquid epoxy resin having an epoxide functionality of 2;

a metal acetylacetonate for catalyzing the epoxy resin; and a substantially nonreactive accelerator of bisphenol A-formaldehyde novolac catalyzed by an acidic catalyst and having a hydroxyl equivalent weight of 120, the accelerator being present in the solventless epoxy resin composition in an amount equal to about 5 to about 15 weight percent of the epoxy resin but in an amount less than the stoichiometric level in terms of the epoxy:novolac and epoxy equivalent:phenolic hydroxyl equivalent ratios:

wherein the solventless epoxy resin composition is substantially unreactive at a temperature of up to at least about 120° C. and undergoes an epoxy reaction at a temperature of about 165° C. to form a solid material having mechanical, thermal and electrical properties that enable the article to serve as an electrical insulating material.

9. An article as recited in claim 8, wherein the metal acetylacetonate constitutes about 0.1 to about 1 weight percent of the epoxy resin.

10. An article as recited in claim 8, wherein the epoxy resin consists essentially of the solid or semi-solid epoxy resin and the liquid epoxy resin.

11. An article as recited in claim 8, wherein the metal acetylacetonate is aluminum acetylacetonate, the solid or semi-solid epoxy resin is an epoxy novolac resin, and the liquid epoxy resin is a bisphenol A- or F-diglycidyl ether epoxy resin.

12. An article as recited in claim 8, wherein the solventless epoxy resin composition remains unreactive for at least two years at room temperature.

13. An article as recited in claim 8, wherein the solventless epoxy resin composition has a viscosity of not more than about 10,000 at a temperature of about 120° C.

14. An article as recited in claim 8, wherein the article is a sheet material.

15. A resin-rich sheet material comprising:

a mica paper impregnated with a solventless epoxy resin composition, the solventless epoxy resin composition comprising:

an epoxy resin consisting essentially of a solid or semi-solid epoxy resin and up to about 50 weight percent of a liquid epoxy resin, the solid or semi-solid epoxy resin having an epoxide functionally of at least 2.5 and the liquid epoxy resin having an epoxide functionally of 2;

a metal acetylacetonate for catalyzing the epoxy resin; and a substantially nonreactive accelerator of bisphenol A-formaldehyde novolac catalyzed by an acidic catalyst and having a hydroxyl equivalent weight of 120, the accelerator being present in the solventless epoxy resin composition in an amount equal to about 5 to about 15 weight percent of the epoxy resin but in an amount less than the stoichiometric level in terms of the epoxy:novolac and epoxy equivalent:phenolic hydroxyl equivalent ratios;

wherein the solventless epoxy resin composition is substantially unreactive at a temperature of up to at least about 120° C., and undergoes an epoxy-epoxy reaction at a temperature of about 165° C. to form a solid material such that the sheet material is characterized by mechanical, thermal and electrical properties that enable the sheet material to serve as an electrical insulating material.

16. A sheet material as recited in claim 15, further comprising a conductor around which the sheet material is wrapped, the sheet material forming at least one electrical insulating layer around the conductor.

17. A sheet material as recited in claim 15, wherein the metal acetylacetonate is present in the solventless epoxy resin composition in an amount equal to about 0.1 to about 1 weight percent of the epoxy resin.

18. A sheet material as recited in claim 15, wherein the solventless epoxy resin composition consists essentially of the epoxy resin, the metal acetylacetonate, and the accelerator.

* * * * *